Feb. 12, 1952  R. DAUB  2,585,540
VALVE COOLING
Filed Aug. 3, 1949  7 Sheets-Sheet 1

INVENTOR.
Rudolph Daub
BY Frank A. Bower
ATTORNEY

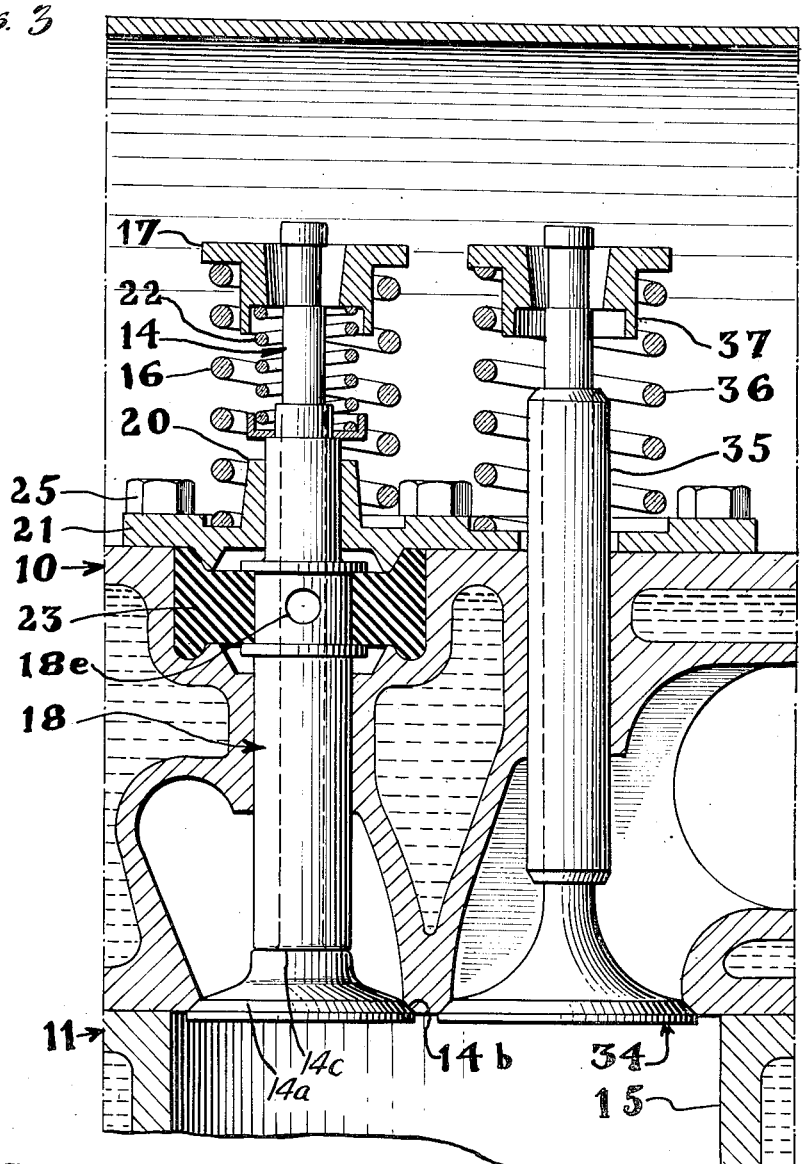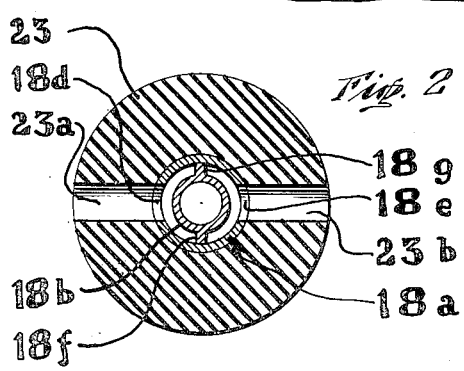

Feb. 12, 1952 — R. DAUB — 2,585,540
VALVE COOLING
Filed Aug. 3, 1949 — 7 Sheets-Sheet 3

INVENTOR.
Rudolph Daub
BY Frank A. Bower
ATTORNEY

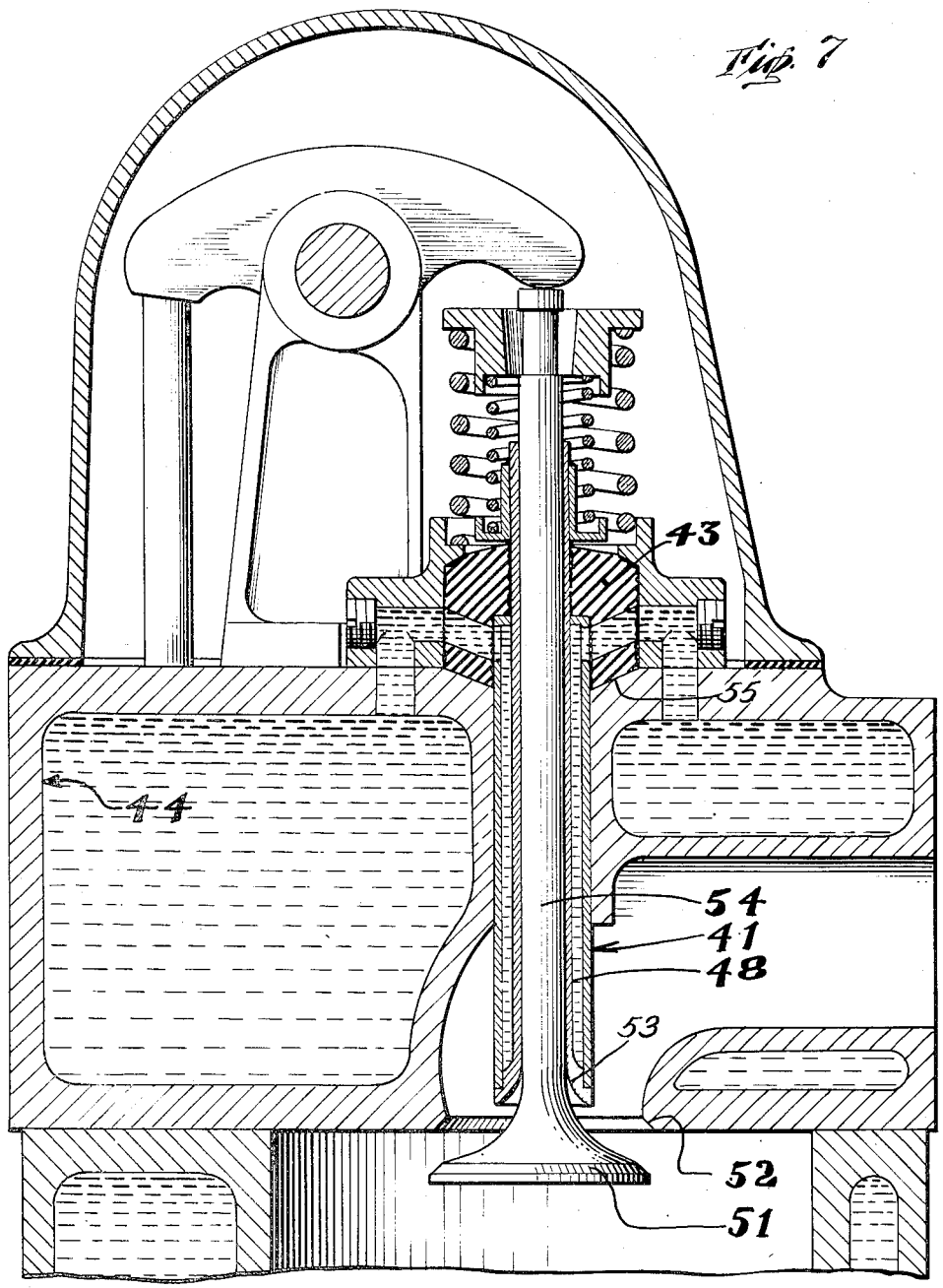

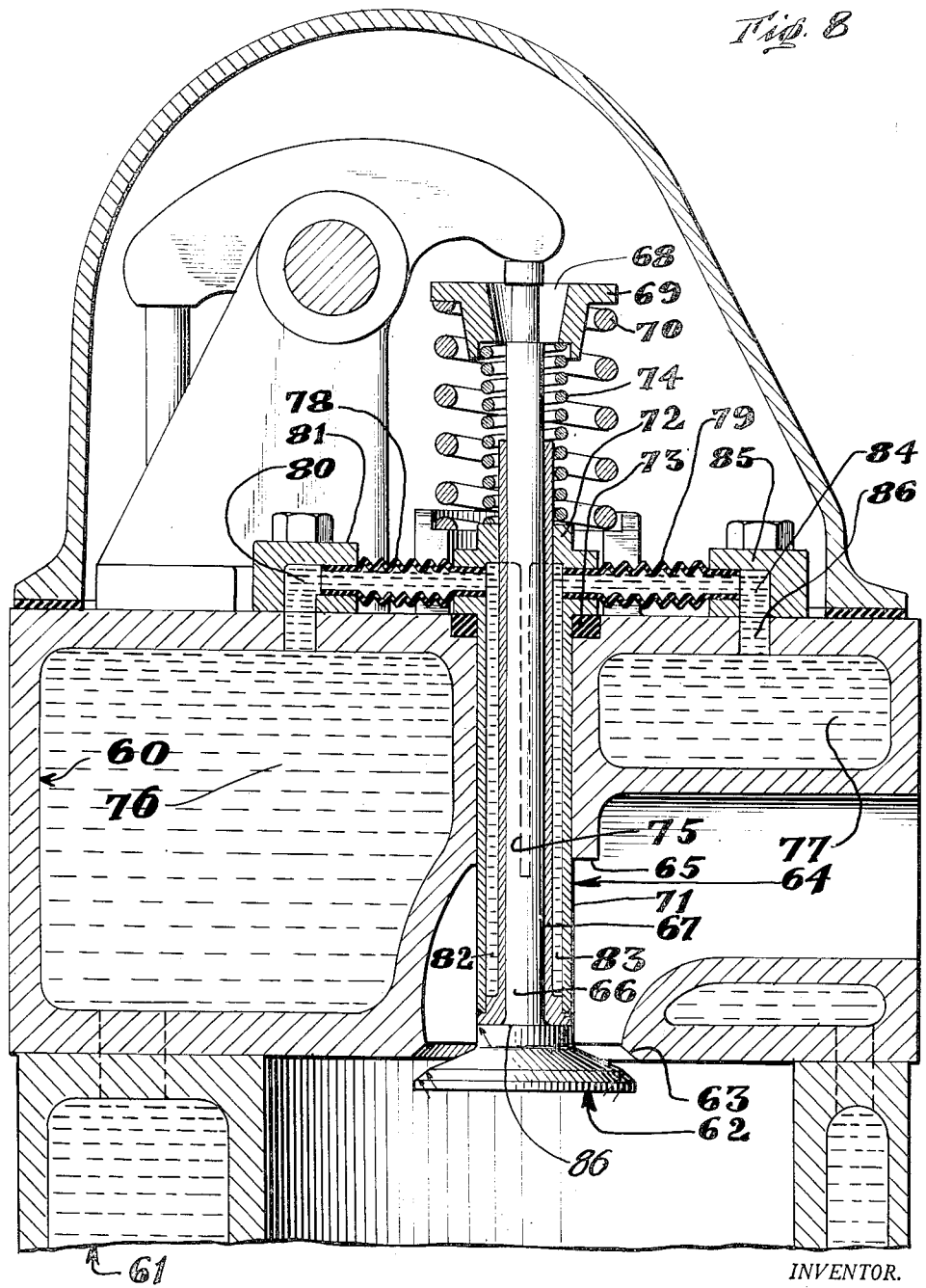

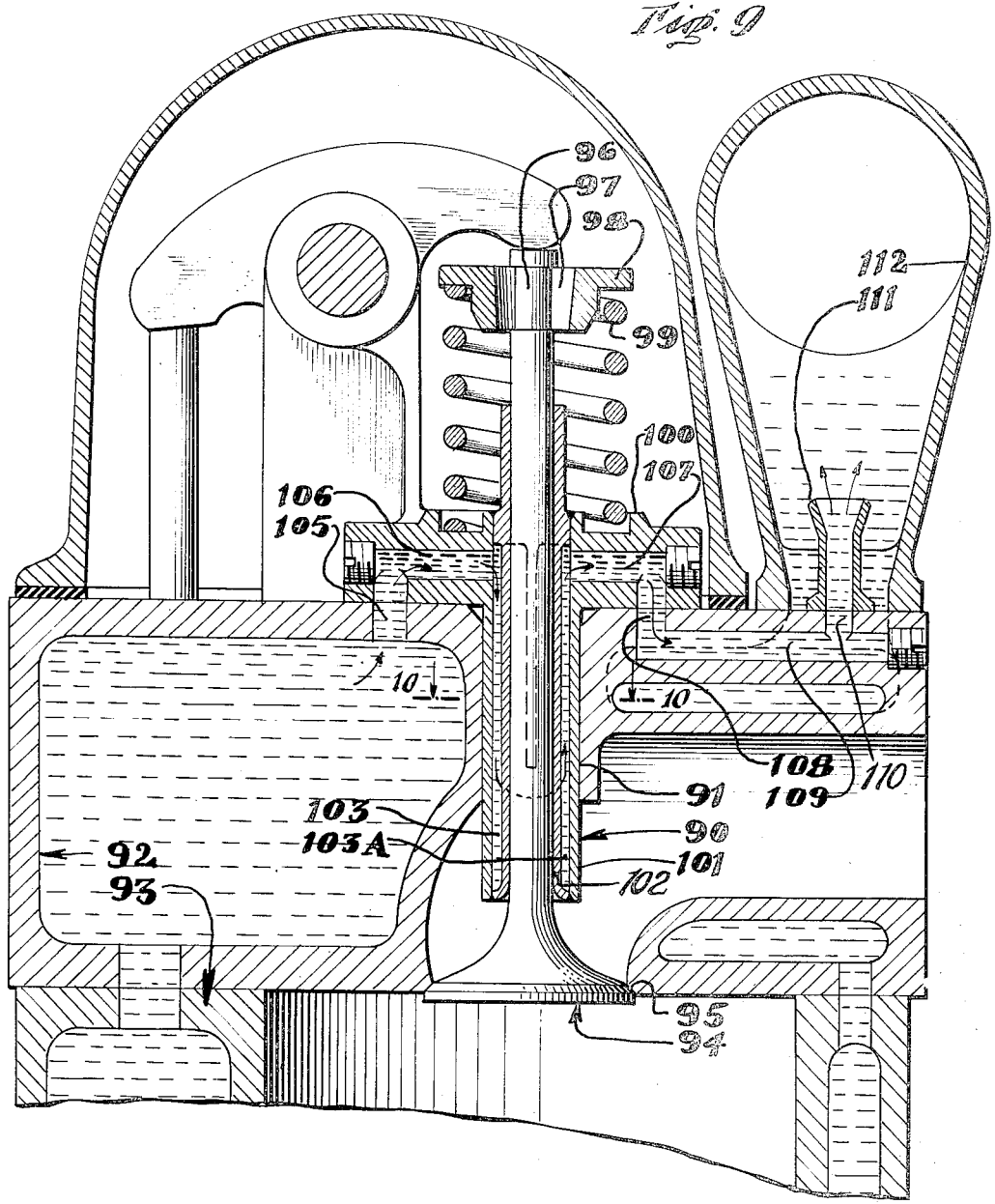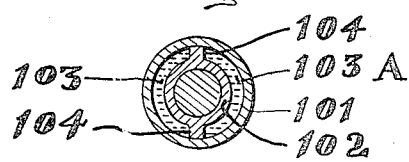

Patented Feb. 12, 1952

2,585,540

UNITED STATES PATENT OFFICE 2,585,540

VALVE COOLING

Rudolph Daub, West Caldwell, N. J.

Application August 3, 1949, Serial No. 108,360

6 Claims. (Cl. 123—41.41)

1

This invention relates to internal combustion engines and particularly to such engines of the poppet valve type.

The object of the invention is to provide for the cooling of the exhaust poppet valves in a manner and to a degree avoiding overheating of the valves and of the explosive charges.

When the exhaust valve of an engine cylinder is overheated it heats the charge in the cylinder and also serves to initiate preignition of this charge. By proper moderation of the exhaust valve temperature such preignition is avoided and the compression ratio of the engine may be substantially increased with corresponding increase in power and economy in fuel consumption.

Further objects of this invention particularly in the construction and mounting of the exhaust valves within the standard engine designs will appear from the following specification taken in connection with the accompanying drawings in which:

Fig. 2 is a fragmentary section taken on the line 2—2 of Fig. 1;

Fig. 3 is a longitudinal section through the intake and exhaust ports of the cylinder head shown in Fig. 1;

Figs. 4, 6 and 7 are sections through the exhaust port of a typical cylinder head with the operating components shown during different intervals of the cycle and illustrating modified constructions;

Fig. 5 shows a fragmentary section taken on line 5—5 of Fig. 4;

Figs 8 and 9 are similar transverse sectional views of modified forms of the invention; and Fig. 10 is a fragmentary section of the valve formation taken along the line 10—10 of Fig. 9.

Figure 1:
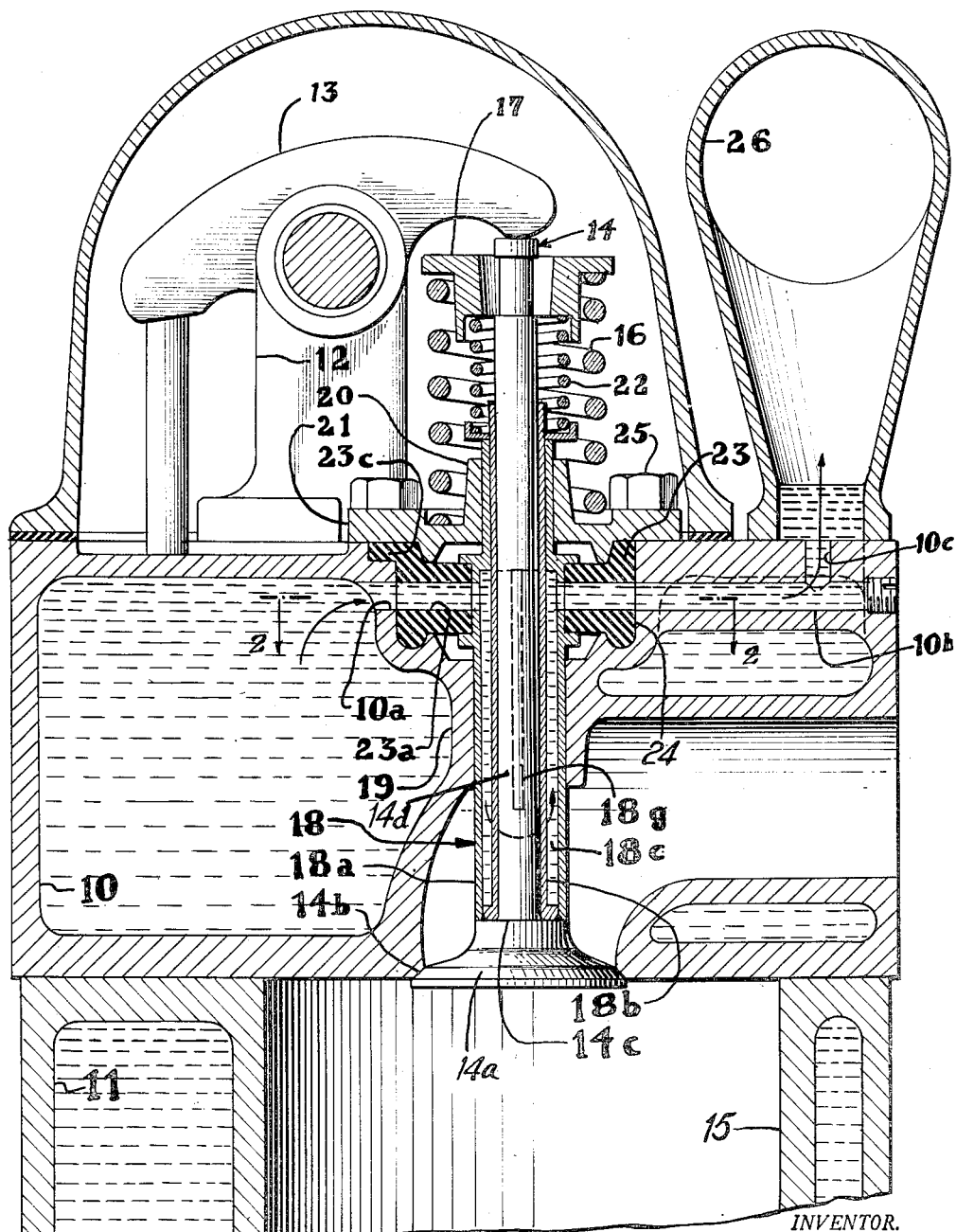
Fig. 1 is a cross-section through the cylinder head of an engine illustrating the invention.
Figures 4, 5:
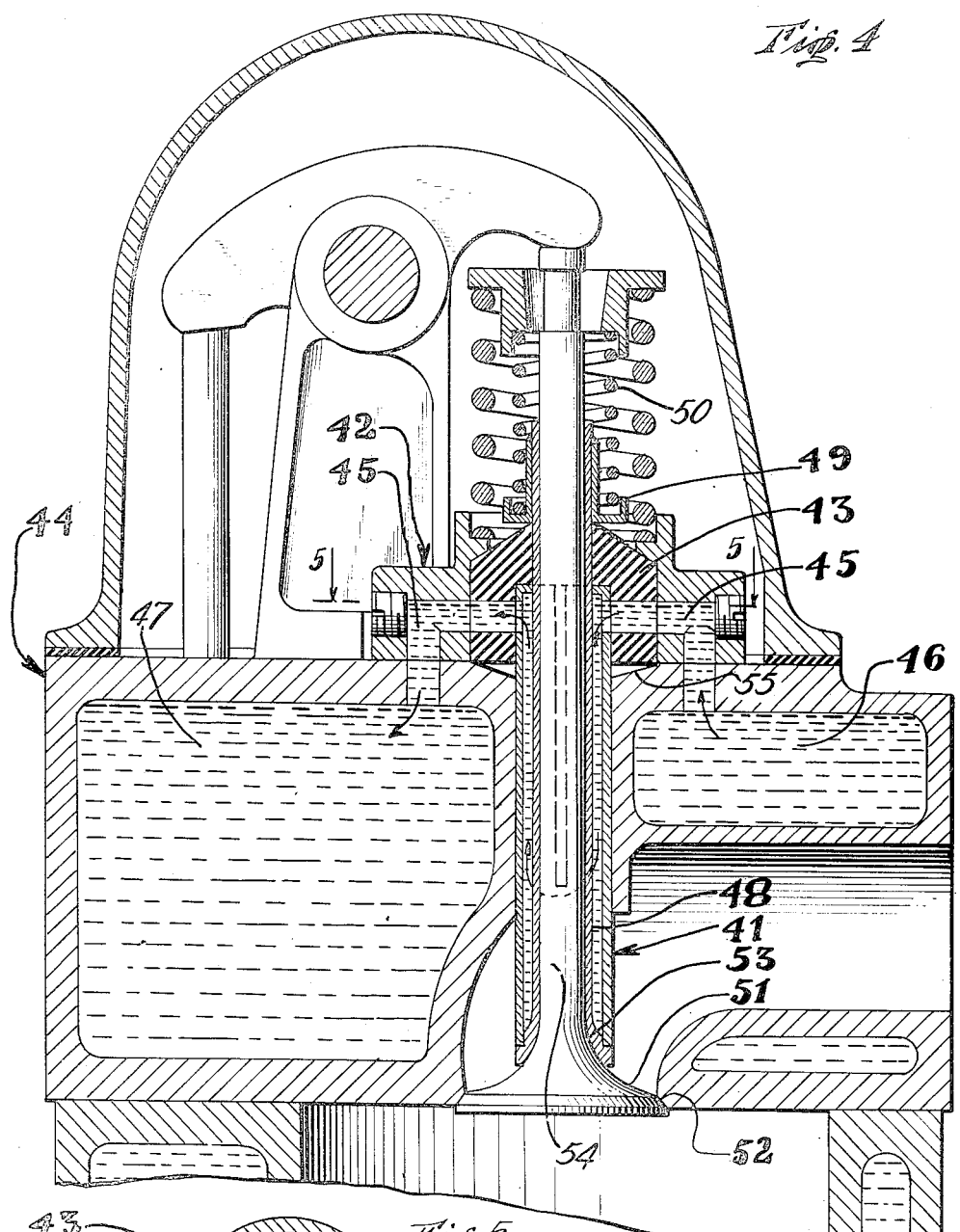

Referring to Figs. 1, 2 and 3, a cylinder head 10 is shown mounted on cylinder block 11. Fastened on the top face of the cylinder block 10 is rocker arm bracket 12 carrying the bearing for rocker arm 13, said rocker arm operating valve 14 with valve head 14a sealing cylinder 15 during appropriate intervals of the cycle in a conventional manner with spiral spring 16 and spring retainer 17 effecting the return of the valve against its seat at 14b.

Bushing assembly 18 forms the guide for stem 14d of valve 14, the axial movement of the valve amounting to the customary ¼ to ½ inch, depending on the size of the engine. Bushing assembly 18 is slidably fitted in boss 19 of cylinder head 10 and boss 20 of bracket 21, this bracket being fastened on the top face of cylinder head 10, the axial movement of the bushing assembly, in the design shown, amounting to ⅛ inch, for instance. Spring 22 placed between the upper part of bushing assembly 18 and the retainer 17 assures contact between the lower face of bushing 18 and shoulder 14c during the greater part of the engine cycle. This contact area 14c in effect forms an auxiliary seat for the head of the valve and therefore an auxiliary area of heat dissipation in addition to the heat dissipating function of the main valve seat 14b formed in the cylinder head 10. Due to the yielding character of auxiliary seat 14c, effective sealing and cooling functions of the main valve seat 14b are in no way impaired.

Auxiliary bushing 18 is constructed of outer bushing 18a and inner bushing 18b, both bushings being brazed or welded together at their outer ends. The shapes of the bushings are such as to form an annular chamber 18c which is provided with openings 18d and 18e at its end remote from the shoulder area which is in contact with the valve head at 14c. Around the part of outer bushing 18a which contains the openings 18d and 18e a substantially cylindrical piece of rubber 23 is molded provided with openings 23a and 23b in line with openings 18d and 18e respectively. Rubber cylinder 23 fits into bore 24 of cylinder head 10 and is held and compressed therein by bracket 21 which is fastened on the top face of cylinder head 10 by means of screws 25. Lip 23c of rubber cylinder 23 fits into a correspondingly placed recess in the top face of head 10 to assure alignment of openings 23a and 23b in the rubber cylinder with openings 10a and 10b drilled through bore 24. Opening 10a communicates with the cooling water supply jacket in the cylinder head 10, while opening 10b by means of hole 10c is connected with the water discharge manifold 26. To assure the best possible flushing of the lower part of compartment 18c, and therefore maximum cooling of the valve head, baffles 18g and 18f are provided, preferably on inner bushing 18b.

It will be noted that heat transfer from the valve head occurs through the lower part of bushing assembly 18 directly into the water without having to transgress the oil film between the valve stem 14d and inner bushing 18b, thereby eliminating gum formation and sticking parts. The same applies to the oil film between outer bushing 18a and boss 19 in cylinder head 10.

In operation the guide 18 will maintain cooling contact with the valve head 14a in seated position of the valve (Figs. 1 and 3). As the valve opens the guide 18 will follow for a predetermined desired distance due to the pressure of spring 22 and the accommodating yielding of the inner portions of the rubbery mounting 23 of the guide. In general the guide 18 will move only a part of the opening travel of the valve so that in fully open position the seat 14c will be separated from the lower end of the guide 18. Then on the return seating movement of the valve the guide is picked up by the seat 14c and this contact is maintained throughout the remainder of the seating travel and during the entire period of closure.

The valve cooling is constant feeding the cooling liquid into proximity with the valve head in a persistent stream. Where the loading of the engine is sufficient to produce conditions vaporizing the coolant in the guide channel the resulting stream will pass to the outlet and condense in the flow on the way to the radiator. The poppet valve cooling system of this invention may be applied in any engine without extensive changes or reorganization. As illustrated in Fig. 3, the intake valve 34 and its operative parts are modified including the guide 38, spring 36 and retainer 37.

Figs. 4–7 show a modified embodiment of the invention in which the circulation to and from the valve guide is carried above the upper face of the cylinder head. In this construction the rubber mounting 43 forms a permanent bond between bushing 41 and bracket 42 fastened on top of cylinder head 44.

Water passages 45 connect the water inlet compartment 46 with the water outlet compartment 47 of cylinder head 44, the path of water flow within the bushing 41 being the same as outlined previously. Spring retainer 49 is welded to the top of inner bushing 48 and forms a seat for spring 50 which assures contact between the lower face of bushing 48 and the upper face of valve head 51 during a large interval of the operating cycle.

Figure 6:
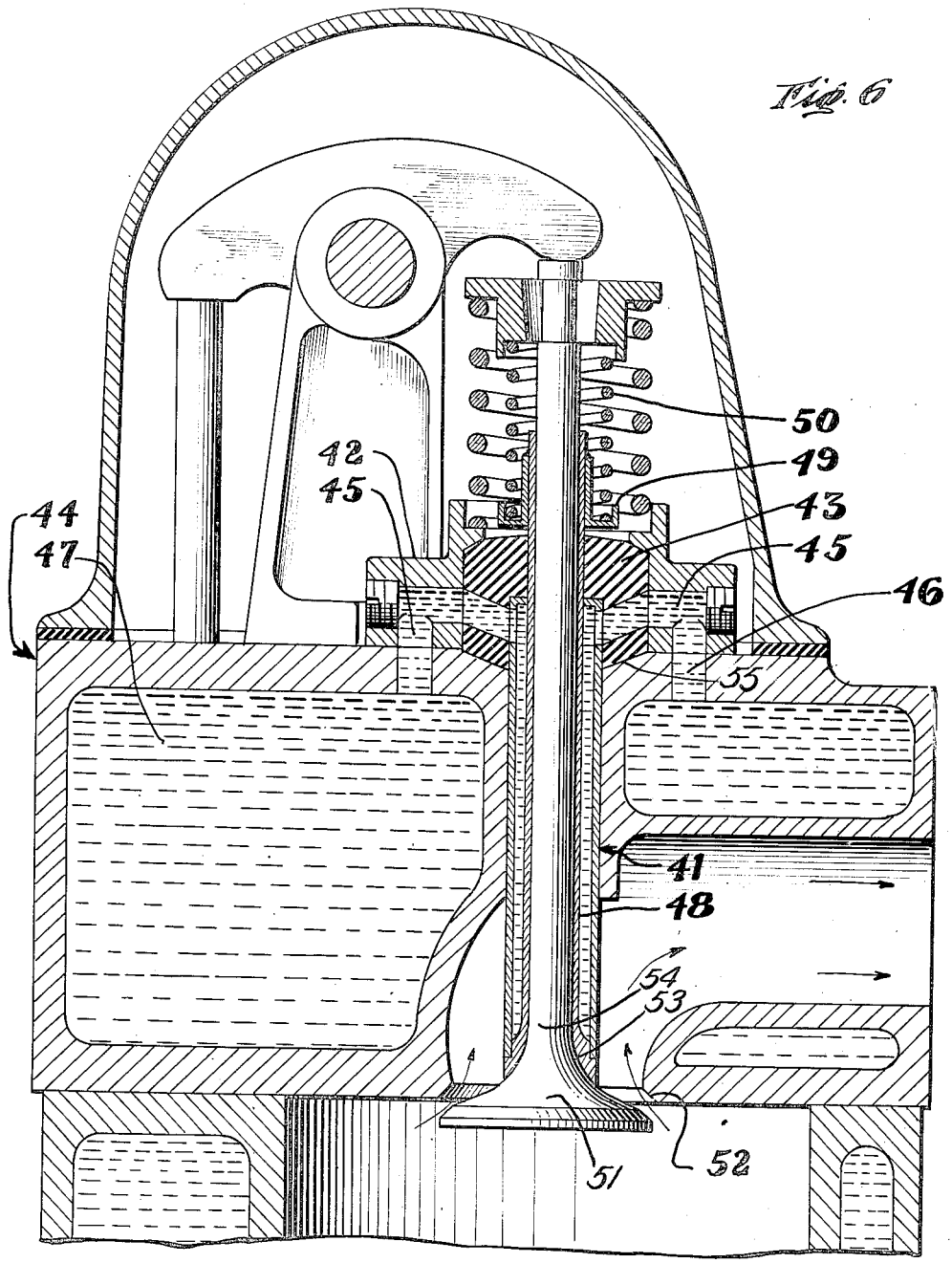

Fig. 6 shows the valve head 51 lifted about ⅛ inch off its seat 52. It is well known that it is during this interval of valve opening when the flaming and therefore the hottest portion of the exhaust gases pass the valve head and its stem. During this period the velocity of the gases is also at their highest point and the heat flow very intense. The invention provides not only maximum heat dissipation during this period from the valve head into the cooling water by maintaining contact at the auxiliary valve seat 53, i. e. between valve head and guide, but simultaneously establishes a protective shield between the exhaust gas flames and the valve stem 54 as well as a large part of the valve head 51.

In Fig. 7 the valve 51 is fully open, having also left its auxiliary seat on bushing 48, the downward travel of which is at a maximum, when the lower face of rubber cylinder 43 contacts the top face 55 of cylinder head 44. However, it is possible to provide sufficient travel for bushing 48 to maintain constant contact at the auxiliary valve seat 53.

In the modification shown in Fig. 8 the cylinder head 60 of cylinder block 61 has exhaust valve 62 and valve seat 63 with guide assembly 64 mounted in housing 65 of the cylinder head. Valve stem 66 extends through the inner bushing 67 of the assembly and is fastened at 68 to the retainer 69 pressed upward by spring 70.

The outer bushing 71 of the assembly has its flange 72 resting on the resilient annular cushion 73 and auxiliary spring 74 is compressed between retainer 69 and the top of the assembly 64. The entrance and discharge channels between the bushings 67 and 71 are separated by baffles 75 and cooling liquid is passed from inflow chamber 76 to these channels and out to outflow chamber 77 by flexible tubing 78, 79. Intake tube 78 connects passage 80 through the cylinder head and block 81 to passage 82 of the assembly and similarly the discharge tube 79 is connected to the outlet 83 of the assembly and passes the cooling liquid on to the passage 84 through block 85 and through the matching opening 86 of the cylinder head leading into the outflow chamber 77. The flexible tubing 78, 79 may be corrugated as shown or be otherwise constructed to be yielding with the movements of the guide assembly. In the position of the parts as shown in the drawing the valve 62 is partly open and the guide assembly is depressed to maintain its lower end in contact with the valve head seat 86. The annular cushion 73 is compressed and further opening movement of the valve will temporarily separate the seat 86 from the guide for a small part of the cycle.

In the modification illustrated in Figs. 9 and 10 the guide assembly 90 is fixedly mounted in the opening 91 of the cylinder head 92 on cylinder block 93. Valve 94 shown closed against its seat 95 has its stem 96 fastened at 97 to retainer 98 for spring 99 which rests on flange 100 of outer bushing 101. Inner bushing 102 is sealed to the outer bushing at each end leaving inlet channel 103 on one side of baffles 104 and outlet channel 103A on the other side. The cooling flow to the valve is provided through orifice 105 to passage 106 of the flange 100 thence through the assembly 90 to passage 107, orifice 108, passage 109 and orifice 110 to outlet venturi 111 subjected to the flow of water through discharge manifold 112 which, for instance, may be at the rate of 40 gallons per minute in a 100 H. P. engine. Similar flow acceleration could be applied, of course, in the engines of Figs. 1 to 8 inclusive.

The forced circulation of the coolant at not substantially over 200° F. and against metal separating it from the valve parts by a wall of less than ⅛" thickness provides a continuous cooling which will effect a reduction in the temperature of the exhaust valve under all conditions of service. This in turn permits higher compression ratios and correspondingly better performance and economy in fuel. The avoidance of the glowing hot spot will be attained by reduction of the temperature of the valve from the objectionable 1200–1500° F. range to below 1000° F. and even to 700° F. with increase of one or two in the permissible compression ratio and a fuel saving of the order of 10% or more is to be expected.

While the invention has been described in reference to specific typical embodiments it is not confined thereto, and consistent with the improved cooling effects the engine will preferably be provided with effective hydraulic valve tappet mechanism and poppet valve operation insuring the desirable rotation of the valve. The material of the bushings in the guide assembly is advantageously a strong metal alloy such as nickel steel and the resilient mounting of resistant rubber composition of proper characteristics such, for instance, as neoprene. The valve in each case may be hollow or hollow stemmed and cooled as by a charge of sodium and the valve structure is equally applicable to various types of engines such, for instance, as the L-head designs.

The invention is not limited to the exact details disclosed but is intended to cover such variations thereof as fall within the scope of the appended claims.

I claim:

1. An internal combustion engine having a combustion chamber, a poppet valve having a stem, a guide in contact with said valve stem and having a space for the reception of cooling fluid formed within said guide, openings communicating with said space for the entrance and exit of said cooling fluid, and baffles partitioning part of said space to divert the flow of the cooling fluid to one end of the space prior to the fluid movement through the exit opening at the opposite end.

2. An exhaust valve structure for the combustion chamber of an internal combustion engine comprising a poppet valve having a head and a stem, a guide around and in contact with said stem including inner and outer bushings forming channels for a coolant between them and a mounting for said guide adapted to support it from the engine parts and having inflow and outflow connections for the coolant entering and leaving said channels.

3. An exhaust valve structure as set forth in claim 2 in which the mounting for the guide is of yielding resilient material.

4. An exhaust valve structure as set forth in claim 2 in which the guide extends along the valve stem to contact with the base of the valve head.

5. An exhaust valve structure as set forth in claim 4 in which the mounting for the guide is of yielding resilient material.

6. An exhaust valve structure as set forth in claim 4 in which the mounting for the guide is of yielding resilient material and a spring yieldingly pressed against said guide in a direction toward said head.

RUDOLPH DAUB.

REFERENCES CITED

The following references are of record in the file of this patent:

UNITED STATES PATENTS

| Number | Name | Date |
|---|---|---|
| 1,731,222 | Blair | Oct. 8, 1929 |
| 1,741,230 | Goodwin | Dec. 31, 1929 |

FOREIGN PATENTS

| Number | Country | Date |
|---|---|---|
| 128,942 | Great Britain | of 1919 |
| 507,039 | Great Britain | of 1939 |